(12) United States Patent
Okawara et al.

(10) Patent No.: US 10,675,846 B2
(45) Date of Patent: Jun. 9, 2020

(54) ADHESIVE FILM, ADHESIVE LAYER-EQUIPPED TRANSPARENT PLATE AND DISPLAY DEVICE

(71) Applicant: AGC Inc., Chiyoda-ku (JP)

(72) Inventors: Atsuo Okawara, Chiyoda-ku (JP); Yuichiro Ogata, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 238 days.

(21) Appl. No.: 15/653,572

(22) Filed: Jul. 19, 2017

(65) Prior Publication Data

US 2017/0313039 A1 Nov. 2, 2017

Related U.S. Application Data

(63) Continuation of application No. PCT/JP2016/053566, filed on Feb. 5, 2016.

(30) Foreign Application Priority Data

Feb. 24, 2015 (JP) .................................. 2015-033448

(51) Int. Cl.
*G09F 3/02* (2006.01)
*B26D 1/09* (2006.01)
(Continued)

(52) U.S. Cl.
CPC .............. *B32B 27/08* (2013.01); *B29C 65/48* (2013.01); *B32B 7/06* (2013.01); *B32B 7/12* (2013.01); *B32B 17/06* (2013.01); *B32B 17/064* (2013.01); *B32B 27/06* (2013.01); *B32B 27/16* (2013.01); *B32B 27/28* (2013.01); *B32B 27/308* (2013.01); *B32B 27/32* (2013.01); *B32B 27/36* (2013.01);
(Continued)

(58) Field of Classification Search
None
See application file for complete search history.

(56) References Cited

U.S. PATENT DOCUMENTS

2013/0273267 A1 10/2013 Niiyama et al.
2014/0178619 A1 6/2014 Niiyama et al.

FOREIGN PATENT DOCUMENTS

CN 102958945 3/2013
CN 103249552 8/2013
(Continued)

OTHER PUBLICATIONS

Machine translation JP2009-046620 (Year: 2009).*
(Continued)

*Primary Examiner* — Alexandre F Ferre
(74) *Attorney, Agent, or Firm* — Oblon, McClelland, Maier & Neustadt, L.L.P.

(57) ABSTRACT

An adhesive film having at least one adhesive layer, where the adhesive layer satisfies the following requirements (a) to (c):
(a) a diffusion coefficient of nitrogen gas of at least $1.5 \times 10^{-6}$ cm$^2$/sec;
(b) a shear modulus G' (1 Hz) of $5 \times 10^2$ to $1.0 \times 10^5$ Pa, at a measurement temperature of 25° C. and a frequency of 1 Hz; and
(c) an absorption peak at from 800 to 820 cm$^{-1}$ and no absorption peak at from 1,000 to 1,020 cm$^{-1}$, in an infrared absorption spectrum.

9 Claims, 4 Drawing Sheets

(51) Int. Cl.
  B05D 5/10    (2006.01)
  B41J 11/70   (2006.01)
  B41J 3/407   (2006.01)
  G09F 3/10    (2006.01)
  B32B 27/08   (2006.01)
  C08G 18/48   (2006.01)
  B32B 27/36   (2006.01)
  C09J 7/10    (2018.01)
  C08F 290/06  (2006.01)
  C08G 18/10   (2006.01)
  C09J 175/16  (2006.01)
  C08G 18/75   (2006.01)
  B32B 27/32   (2006.01)
  B32B 17/06   (2006.01)
  C09J 201/00  (2006.01)
  B32B 27/28   (2006.01)
  B32B 7/06    (2019.01)
  B32B 27/06   (2006.01)
  B29C 65/48   (2006.01)
  B32B 7/12    (2006.01)
  B32B 27/16   (2006.01)
  B32B 27/30   (2006.01)
(52) U.S. Cl.
  CPC ........ *B32B 27/365* (2013.01); *C08F 290/067* (2013.01); *C08G 18/10* (2013.01); *C08G 18/4841* (2013.01); *C08G 18/755* (2013.01); *C09J 7/10* (2018.01); *C09J 175/16* (2013.01); *C09J 201/00* (2013.01); *B32B 2307/412* (2013.01); *B32B 2307/50* (2013.01); *B32B 2307/584* (2013.01); *B32B 2307/732* (2013.01); *B32B 2307/748* (2013.01); *B32B 2457/20* (2013.01); *C09J 2203/318* (2013.01); *C09J 2475/00* (2013.01)

(56) References Cited

FOREIGN PATENT DOCUMENTS

| | | |
|---|---|---|
| CN | 103886806 | 6/2014 |
| JP | 7-164873 | 6/1995 |
| JP | 2005-75953 | 3/2005 |
| JP | 2009-46620 | 3/2009 |
| JP | 2009-263502 | 11/2009 |
| JP | 2015-10160 | 1/2015 |
| JP | 5652506 B2 | 1/2015 |
| WO | WO 2012/020710 A1 | 2/2012 |

OTHER PUBLICATIONS

Machine translation JP2009-263502 (Year: 2009).*
International Search Report dated Mar. 8, 2016 in PCT/JP2016/053566 filed Feb. 5, 2016.

* cited by examiner

ADHESIVE FILM, ADHESIVE LAYER-EQUIPPED TRANSPARENT PLATE AND DISPLAY DEVICE

This application is a continuation of PCT Application No. PCT/JP2016/053566, filed on Feb. 5, 2016, which is based upon and claims the benefit of priority from Japanese Patent Application No. 2015-033448 filed on Feb. 24, 2015. The contents of those applications are incorporated herein by reference in their entireties.

TECHNICAL FIELD

The present invention relates to an adhesive film, an adhesive layer-equipped transparent plate and a display device.

BACKGROUND ART

A display device having a display panel and a protective plate bonded via an adhesive film, has been known (Patent Document 1).

PRIOR ART DOCUMENTS

Patent Documents

Patent Document 1: JP-A-2009-263502

DISCLOSURE OF INVENTION

Technical Problem

In a case where a display panel and a protective film are bonded by a conventional adhesive film, air bubbles tend to be formed at the interface between the adhesive film and the protective film or the display panel, whereby the display image quality of the display panel tends to be impaired. Heretofore, in order to let the air bubbles disappear, a display device having a display panel and a protective plate bonded via an adhesive film is left to stand under pressure at high temperature (hereinafter, referred to as autoclave treatment).

However, the autoclave treatment may prolong a process time or may cause heat damage of a display panel.

The present invention has been made to solve the above problems, and it is an object of the present invention to provide an adhesive film by which, even if air bubbles are formed at a bonding interface when the adhesive film is used for bonding, the air bubbles readily disappear under normal temperature and normal pressure.

Solution to Problem

The adhesive film of the present invention comprises at least one adhesive layer, wherein the adhesive layer satisfies the following requirements (a) to (c):

(a) a diffusion coefficient of nitrogen gas is at least $1.5 \times 10^{-6}$ cm$^2$/sec, (b) a shear modulus G' (1 Hz) is from $5 \times 10^2$ to $1.0 \times 10^5$ Pa, at a measurement temperature of 25° C. and a frequency of 1 Hz, and (c) the adhesive layer has an absorption peak at from 800 to 820 cm$^{-1}$ and no absorption peak at from 1,000 to 1,020 cm$^{-1}$, in an infrared absorption spectrum.

The adhesive layer-equipped transparent plate of the present invention comprises a transparent plate and at least one adhesive layer on one main surface of the transparent plate, wherein the adhesive layer satisfies the following requirements (a) to (c):

(a) a diffusion coefficient of nitrogen gas is at least $1.5 \times 10^{-6}$ cm$^2$/sec, (b) a shear modulus G' (1 Hz) at a measurement temperature of 25° C. and a frequency of 1 Hz, is from $5 \times 10^2$ to $1.0 \times 10^5$ Pa, and (c) the adhesive layer has an absorption peak at from 800 to 820 cm$^{-1}$ and no absorption peak at from 1,000 to 1,020 cm$^{-1}$, in an infrared absorption spectrum.

Further, the display device of the present invention has a transparent plate and a display panel laminated via the adhesive film.

Advantageous Effects of Invention

According to the present invention, it is possible to provide an adhesive film by which, even if air bubbles are formed at a bonding interface when the adhesive film is used for bonding plates, the air bubbles disappear under normal pressure, and an adhesive layer-equipped transparent plate. Further, it is possible to provide a display device in which formation of air bubbles is suppressed.

DESCRIPTION OF EMBODIMENTS

Figure 1:
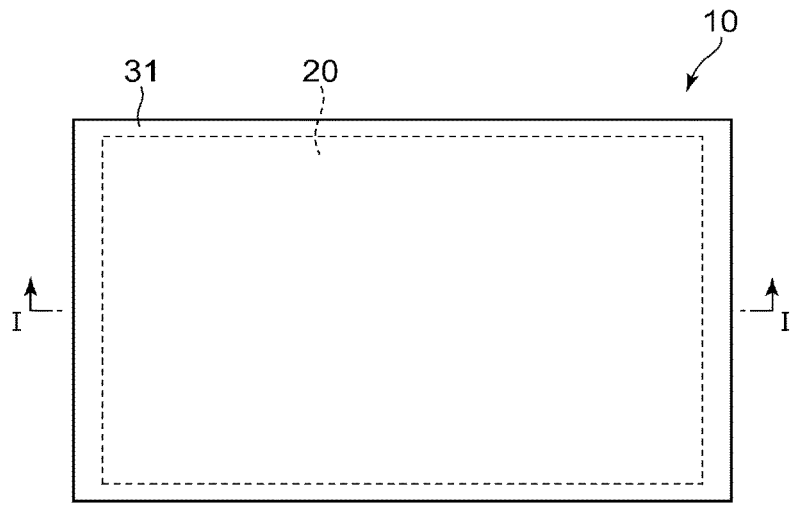
FIG. 1 is a plan view illustrating an adhesive film having one adhesive layer of the present embodiment.

Now, embodiments of the present invention will be described with reference to the drawings.

Here, the scope of the present invention is by no means limited to the following embodiments, and may be optionally modified within the range of the technical idea of the present invention. Further, in the following drawings, the respective structures may be shown as differentiated in their sizes, numbers, etc. from the real structures in order to make various constructions easily understandable.

In the explanation of the present embodiment, an adhesive layer satisfying the requirements (a) to (c) as explained below will be referred to as an adhesive layer I, and an adhesive layer other than the adhesive layer I will be referred to as an adhesive layer II. Further, in the case of indicating both of the adhesive layer I and the adhesive layer II, such an adhesive layer will be simply referred to as an adhesive layer.

(Adhesive Film)

The adhesive film of the present embodiment has at least one adhesive layer I. In view of easiness of handling, an adhesive film has such a structure that an adhesive layer is sandwiched between a pair of protective films or a structure that one protective film having an adhesive layer provided thereon is wound into a roll shape, whereby it is possible to cut out and transport an adhesive layer without touching the adhesive layer.

[Adhesive Layer I]

The adhesive layer I of the present invention satisfies the following requirements (a) to (c), that is the characteristics (a) to (c).

(a) a diffusion coefficient of nitrogen gas is at least $1.5 \times 10^{-6}$ cm²/sec, (b) a shear modulus G' (1 Hz) is from $5 \times 10^2$ to $1.0 \times 10^5$ Pa at a measurement temperature of 25° C. and a frequency of 1 Hz, and (c) the adhesive layer has an absorption peak at from 800 to 820 cm$^{-1}$ and no absorption peak at from 1,000 to 1,020 cm$^{-1}$, in an infrared absorption spectrum.

The adhesive layer I has a diffusion coefficient of nitrogen gas being at least $1.5 \times 10^{-6}$ cm²/sec, and therefore even when air bubbles are formed at the bonding interface, the air bubbles disappear in a short time.

When an adhesive film is bonded to an object, air bubbles are likely to form at the bonding interface. The present inventors have found that air bubbles formed at the bonding interface when an adhesive film is bonded to an object, disappear in a short time, in a case where diffusion coefficient of nitrogen gas among various gases is suppressed within the above range.

The diffusion coefficient of nitrogen gas in the adhesive layer I is preferably at least $1.55 \times 10^{-6}$ cm²/sec., particularly preferably at least $1.6 \times 10^{-6}$ cm²/sec. in view of excellent disappearance characteristics of air bubbles. On the other hand, the diffusion coefficient of nitrogen gas in the adhesive layer I is preferably at most $3.0 \times 10^{-6}$ cm²/sec. If the diffusion coefficient of nitrogen gas in the adhesive layer I exceeds $3.0 \times 10^{-6}$ cm²/sec., air bubbles are likely to be formed at the bonding interface between the adhesive layer I and an object to be bonded, and therefore adhesion at the bonding interface tends to deteriorate.

The diffusion coefficient of nitrogen gas in the adhesive layer I is calculated by means of formula 1 from the thickness of an adhesive layer and a delay time to in a non-steady state measured under the following conditions 1, by using a high temperature and high pressure gas permeability measurement apparatus (for example, apparatus name: K-315-H, manufactured by Tsukuba Rika Seiki K.K.).

(Conditions 1)

An adhesive layer is bonded to one side of a 30 μm-thick stretched polypropylene substrate to prepare a sample.

The sample is sandwiched by a cell, and nitrogen gas is introduced from the substrate side.

A mass of the nitrogen gas permeated via the sample sandwiched by the cell is analyzed by a mass spectrometer thereby to measure the lapse of time of the mass.

A high purity product is used as the nitrogen gas, a measurement temperature is 25° C., a pressure is 100 kPa, and a cell of 50 mm in diameter is used.

Diffusion coefficient $D_{N2}$ of nitrogen gas=$L^2/(6 \times t_0)$    Formula 1:

wherein a delay time to is a value $(t_0 = t_1 - t_2)$ obtained by subtracting a delay time $t_2$ in a non-steady state of a permeability curve of only the substrate from a delay time $t_1$ in a non-steady state of a permeability curve of the sample, and L is a film thickness (unit: cm) of the adhesive layer.

In the adhesive layer I, the diffusion coefficient of air is preferably at least $1.7 \times 10^{-6}$ cm²/sec. When the diffusion coefficient of air is at least $1.7 \times 10^{-6}$ cm²/sec., the diffusion rate of air in the adhesive layer I would be high. As a result, even if air bubbles are formed at the interface between an adhesive film and an object to be bonded, the air bubbles would disappear in a shorter time under a normal pressure. The diffusion coefficient of air is more preferably at least $1.8 \times 10^{-6}$ cm²/sec., furthermore preferably at least $2 \times 10^{-6}$ cm²/sec. On the other hand, the diffusion coefficient of air in the adhesive layer I is preferably at most $3 \times 10^{-6}$ cm²/sec. If the diffusion coefficient of air in the adhesive layer I exceeds $3 \times 10^{-6}$ cm²/sec., the adhesion of the adhesive layer I at the bonding interface tends to deteriorate.

The diffusion coefficient of air is measured by using the same apparatus as in the measurement of the diffusion coefficient of nitrogen gas, under the same conditions as in the measurement of the diffusion coefficient of nitrogen gas except that the following conditions 2 are employed.

(Conditions 2)

Air is used, a measurement temperature is 25° C., a pressure is 100 kPa, and a cell of 50 mm in diameter is used.

In the adhesive layer I, the diffusion coefficient of oxygen gas is more preferably at least $1.9 \times 10^{-6}$ cm²/sec. When the diffusion coefficient of oxygen is at least $1.9 \times 10^{-6}$ cm²/sec., most of gas in the air quickly diffuses in the adhesive layer I, and therefore even if air bubbles are formed at the interface between an adhesive film and an object to be bonded, the air bubbles would disappear in a short time under a normal pressure. The diffusion coefficient of oxygen in the adhesive layer I is more preferably at least $2 \times 10^{-6}$ cm²/sec., particularly preferably at least $2.1 \times 10^{-6}$ cm²/sec. On the other hand, the diffusion coefficient of oxygen gas in the adhesive layer I is preferably at most $3 \times 10^{-6}$ cm²/sec. If the diffusion coefficient of oxygen gas in the adhesive layer I exceeds $3 \times 10^{-6}$ cm²/sec., the adhesion of the adhesive layer I at the bonding interface tends to deteriorate.

The diffusion coefficient of oxygen gas is measured by using the same apparatus as in measurement of the diffusion coefficient of nitrogen gas, under the same conditions as in the measurement of the diffusion coefficient of nitrogen gas except that the following conditions 3 are employed.

(Conditions 3)

A high purity product is used as the oxygen gas, a measurement temperature is 25° C., a pressure is 100 kPa, and a cell of 50 mm in diameter is used.

A shear modulus G' (1 Hz) of the adhesive layer I is from $5 \times 10^2$ to $1 \times 10^5$ Pa, at a measurement temperature of 25° C. and a frequency of 1 Hz. The shear modulus G' (1 Hz) of the adhesive layer I is within such a range, and it is thus possible to maintain the shape of the adhesive layer I and to fix the object when the adhesive film of the present embodiment is used for bonding. If the shear modulus G' (1 Hz) is less than $5 \times 10^2$ Pa, the adhesive layer I is likely to be deformed, and therefore even when the adhesive film is used for bonding, the object may not be fixed. On the other hand, if the shear modulus G' (1 Hz) of the adhesive layer I exceeds $1 \times 10^5$ Pa, the adhesive layer I would be too hard, and therefore, for example, in a case where the object to be bonded has irregularities such as steps, the adhesive layer I may fail to follow the irregularities, whereby air bubbles are likely to remain on the irregularities.

The shear modulus G' (1 Hz) of the adhesive layer I is more preferably from $1 \times 10^3$ to $8 \times 10^4$ Pa, furthermore preferably from $5\times10^3$ to $5\times10^4$ Pa. When the shear modulus G' (1 Hz) of the adhesive layer I is within the above range, it is possible to suppress deformation of the adhesive layer I, and further it is possible to suppress formation of air bubbles at the interface between an object to be bonded and the adhesive layer at the time of bonding.

The adhesive layer I has an absorption peak at from 800 to 820 $cm^{-1}$ and no absorption peak at from 1,000 to 1,020 $cm^{-1}$, in an infrared absorption spectrum. In the infrared absorption spectrum, the absorption peak at from 800 to 820 $cm^{-1}$ is an absorption band of out-of-plane bonding vibration of C—H in a vinyl group. Further, the absorption peak at from 1,000 to 1,020 $cm^{-1}$ is an absorption band (typically, an absorption peak is present at 1,010 $cm^{-1}$) of stretching vibration of Si—O—Si. If the adhesive layer I has a Si—O—Si bond, the adhesive layer I tends to be turbid when contacted with moisture air or water. For example, if the adhesive layer becomes turbid at the time of bonding a transparent plate to a display panel, the quality of the display device will deteriorate.

Further, the absorption at from 800 to 820 $cm^{-1}$ and the absorption at from 1,000 to 1,020 $cm^{-1}$ may, for example, be confirmed by infrared absorption spectrum measurement using a sample having the adhesive layer I bonded to a sample folder.

The glass transition temperature of the adhesive layer I is preferably at most −65° C. When the glass transition temperature of the adhesive layer I is within the above range, the adhesion to an object to be bonded would be high at a normal temperature. The glass transition temperature of the adhesive layer I is more preferably at most −70° C.

The adhesive layer I is preferably such that tan δ is from 0.01 to 1.4 at a measurement temperature of 25° C. and a frequency of 1 Hz. When tan δ is within such a range, it is possible to sufficiently fix objects to be bonded to each other even when the objects are placed perpendicularly. Further, it is possible to prevent the bonding interface from slipping with time by e.g. plastic deformation of the adhesive layer I because of the own weights of the objects to be bonded. Tan δ is more preferably from 0.05 to 1, furthermore preferably from 0.1 to 0.8.

The thickness of the adhesive layer I is not particularly limited, and may be freely designed depending on the application of the adhesive film. For example, when the adhesive film is used to bond a protective plate to a display panel of a display device, the thickness is preferably from about 0.1 to 2 mm, more preferably from 0.15 to 1.5 mm. When the thickness of the adhesive layer I is at least 0.1 mm, in a case where a protective plate and a display panel of a display device are bonded, the adhesive layer will effectively absorb e.g. a shock by an external force from the protective plate side, and can thereby protect the main body of the display device. Further, even if a foreign matter not exceeding the thickness of the adhesive layer is included between the protective plate and the display panel of the display device, the thickness of the adhesive layer will not change substantially, and there will be little influence over the light transmitting performance. When the thickness of the adhesive layer is at most 2 mm, it becomes easy to bond the protective plate to the display panel of the display device via the adhesive layer, and the entire thickness of the display device can be made thin. Here, the above bonding of a protective plate and a display panel of a display device, means that the above protective plate and the display surface of the display panel of the display device, that is an image display surface, are bonded, and the same applies in the present specification.

[Resin Composition]

It is preferred that the adhesive layer I is formed by curing a resin composition as mentioned below. Now, components in the resin composition will be described.

The resin composition contains, as an essential component, a curable component I having photocurability. The curable component I contains, as an essential compound, a compound having an absorption peak at from 800 to 820 $cm^{-1}$ corresponding to an absorption band of out-of-plane bonding vibration of C—H in a vinyl group.

It is preferred that the resin composition contains the following non-curable component II and a photopolymerization initiator III.

(Curable Component I)

It is preferred that the curable component I contains at least one polymer A1 having a curable group and a number average molecular weight of from 1,000 to 100,000, and at least one monomer A2 having a curable group and a molecular weight of from 125 to 600. When such a curable component I is used, it is possible to easily adjust the viscosity of the resin composition to be within a preferred range, whereby it is possible to easily produce the adhesive layer I.

The curable group in the polymer A1 or the monomer A2 may, for example, be an addition-polymerizable unsaturated group (such as an acryloyloxy group or a methacryloyloxy group) or a combination of an unsaturated group and a thiol group. From the viewpoint that the curing speed is high and that a highly transparent adhesive layer I is obtainable, the curable group is preferably an acryloyloxy group or a methacryloyloxy group.

The curable group in the polymer A1 and the curable group in the monomer A2 may be the same or different from each other.

In order to shorten the time required for the curing reaction, it is preferred that the curable groups in the polymer A1 and the monomer A2 are acryloyloxy groups with high reactivity.

(Polymer A1)

The number average molecular weight of the polymer A1 is preferably from 1,000 to 100,000, more preferably from 10,000 to 70,000. When the number average molecular weight of the polymer A1 is within this range, it is easy to adjust the viscosity of the resin composition to be within the above range. The number average molecular weight of the polymer A1 is a number average molecular weight calculated as polystyrene, obtained by measurement of gel permeation chromatography (GPC). Here, in a case where a peak of an unreacted low molecular weight component (such as a monomer) appears in the measurement of GPC, the number average molecular weight is obtained by excluding such a peak.

The polymer A1 is preferably one having from 2 to 4 curable groups on average in one molecule, with a view to suppressing curability of the resin composition and the mechanical properties of the adhesive layer I.

The polymer A1 may, for example, be a urethane polymer having a urethane bond, a poly(meth)acrylate of a polyoxyalkylene polyol or a poly(meth)acrylate of a polyester polyol. A urethane polymer is preferred with a view to widely adjusting e.g. the mechanical properties of the resin after curing or the adhesion to an object to be bonded, by means of e.g. molecular design of the urethane chain.

The urethane polymer may be synthesized by a method wherein a polyol and a polyisocyanate are reacted to obtain a prepolymer having an isocyanate group, and then, a monomer is reacted to the isocyanate group of the prepolymer. The polyol and the polyisocyanate may be known compounds, for example, polyol i, diisocyanate ii, etc. disclosed as raw materials for a urethane polymer a disclosed in WO2009/016943, which are incorporated in this specification by reference.

The proportion of the polymer A1 in the curable component I is preferably from 1 to 90 mass %, more preferably from 5 to 80 mass %. When the proportion of the polymer A1 is at least 1 mass %, the heat resistance of the adhesive layer I will be good. When the proportion of the polymer A1 is at most 90 mass %, the curability of the resin composition and the adhesion between an object to be bonded and the adhesive layer I will be good.

(Monomer A2)

The molecular weight of the monomer A2 is preferably from 125 to 600. When the molecular weight of the monomer A2 is within this range, it is possible to obtain the adhesive layer I having good adhesion. The molecular weight of the monomer A2 is preferably from 140 to 400. The monomer A2 is preferably one having from 1 to 3 curable groups in one molecule, with a view to suppressing curability of the resin composition and the mechanical properties of the adhesive layer I.

The proportion of the monomer A2 in the curable component I is preferably from 10 to 99 mass %, more preferably from 20 to 95 mass %.

The monomer A2 can be roughly classified into a monomer A2' having a curable group and a hydroxy group and a monomer A2" having a curable group and no hydroxy group.

The monomer A2" having a curable group and no hydroxy group is preferably at least one member selected from an alkyl acrylate and an alkyl methacrylate having a $C_{8-22}$ alkyl group. As a specific example of the monomer A2, n-decyl acrylate, n-dodecyl acrylate, n-dodecyl methacrylate, isooctadecyl acrylate, n-octadecyl methacrylate or n-behenyl methacrylate may be mentioned, and n-decyl acrylate, n-dodecyl acrylate or n-dodecyl methacrylate is preferred.

In the present embodiment, the monomer A2 preferably contains the monomer A2' having a curable group and a hydroxy group. When the monomer A2' is contained in the curable component I, in a case where the after-mentioned non-curable component II is contained in the resin composition, it is possible to increase the compatibility of the non-curable component II. Further, when the monomer A2' is contained therein, in a case where an object to be bonded is glass, the adhesion between the adhesive layer I and the glass improves, such being preferred.

The monomer A2' may, for example, be 2-hydroxypropyl acrylate, 2-hydroxybutyl acrylate, 4-hydroxybutyl acrylate, 6-hydroxyhexyl acrylate, 2-hydroxypropyl methacrylate, 2-hydroxybutyl methacrylate, 4-hydroxybutyl methacrylate or 6-hydroxyhexyl methacrylate. Among them, a hydroxy acrylate having a $C_{2-8}$ hydroxyalkyl group is preferred, and 4-hydroxybutyl acrylate is particularly preferred.

Further, the proportion of the monomer A2' in the curable component I is preferably from 10 to 60 mass %, more preferably from 20 to 50 mass %. When the proportion of the monomer A2' is at least 10 mass %, it is possible to sufficiently obtain effects of improvement in stability of the resin composition and improvement in adhesion between the adhesive layer I and an object to be bonded.

Further, the proportion of the monomer A2" in the curable component I is preferably from 10 to 60 mass %, more preferably from 20 to 50 mass %. When the proportion of the monomer A2' is at least 10 mass %, the stability of the resin composition can be improved, and the shear modulus G" of the adhesive layer I can be readily within a range of from $5\times10^2$ to $1\times10^5$ Pa.

(Non-Curable Component II)

The non-curable component II is a component which undergoes no curing reaction with the curable compound I at the time of curing the curable component I in the resin composition. In the present embodiment, the non-curable component II is preferably a polymer B containing a hydroxy group.

The number of hydroxy groups in one molecule of the polymer B is preferably from 0.8 to 3, more preferably from 1.8 to 2.3. The number average molecular weight of the polymer B is preferably from 400 to 8,000, more preferably from 800 to 6,000.

When the number average molecular weight of the polymer B is from 400 to 8,000, it is possible to increase the compatibility with the curable component I in the resin composition. As a result, the adhesive layer I obtainable by curing the resin composition can be transparent.

The polymer B may be used alone or in combination of two or more of them.

As an example of the polymer B, a high molecular weight polyol may be mentioned, and a polyoxyalkylene polyol, a polyester polyol or a polycarbonate polyol is preferred. The polyoxyalkylene polyol may, for example, be a polyoxyalkylene glycol such as polyoxyethylene glycol, polyoxypropylene glycol, polyoxypropylene glycol having a branched structure or polyoxytetramethylene glycol.

The polyoxyalkylene polyol may, for example, be an aliphatic polyester diol having a residue of an aliphatic diol such as ethylene glycol, propylene glycol or 1,4-butanediol, and a residue of an aliphatic dicarboxylic acid such as glutaric acid, adipic acid or sebacic acid.

The polycarbonate polyol may, for example, be an aliphatic polycarbonate diol having a diol residue of e.g. 1,6-hexanediol, or an aliphatic polycarbonate diol such as a ring-opened polymer of an aliphatic cyclic carbonate.

As the polymer B, it is preferred to use a polyoxyalkylene polyol, particularly preferably polyoxypropylene polyol, with a view to lowering the shear modulus G' of the adhesive layer I after curing. Further, a part of oxypropylene groups in the polyoxypropylene polyol may be substituted by an oxyethylene group. For example, from the viewpoint of compatibility, it is preferred that the polymer A1 is a urethane polymer synthesized by using a polyoxyalkylene polyol and a polyisocyanate as raw materials, and the polymer B is a polyoxyalkylene polyol.

When the non-curable component II is contained in the resin composition, it is possible to obtain an effect of shortening the time until disappearance of air bubbles formed at the interface between the adhesive layer I and an object to be bonded under normal pressure. The proportion of the non-curable component II in the resin composition is preferably from 10 to 70 parts by mass based on the total mass (100 parts by mass) of the curable component I. When the content of the non-curable component II in the resin composition is within this range, it is possible to obtain a sufficient effect of disappearance of air bubbles, and further it is possible to sufficiently cure the adhesive layer I. Further, in a case where at least two types of non-curable components II are used, the proportion is a proportion of the total amount of the non-curable components II.

(Photopolymerization Initiator III)

The photopolymerization initiator III contained in the resin composition may be a photopolymerization initiator of e.g. acetophenone type, ketal type, benzoin or benzoin ether type, phosphine oxide type, benzophenone type, thioxanthone type or quinone type. A phosphine oxide type or thioxanthone type photopolymerization initiator is preferred, and with a view to preventing coloration after the photopolymerization reaction, a phosphine oxide type is particularly preferred. In a case where the photopolymerization is carried out by high intensity light irradiation, it is preferred to use an acetophenone type photopolymerization initiator, whereby the curing speed may be increased. The content of the photopolymerization initiator III in the resin composition is preferably from 0.01 to 10 parts by mass, more preferably from 0.1 to 5 parts by mass, based on the total mass (100 parts by mass) of the curable component I.

In addition to the curable component I, the non-curable component II and the photopolymerization initiator III, the resin composition may contain, as the case requires, various additives such as a chain transfer agent, a polymerization inhibitor, a photocuring accelerator, a photostabilizer (such as an ultraviolet absorber or a radical scavenger), an antioxidant, a flame retardant, an adhesion-improving agent (such as a silane coupling agent), a pigment, a dye, etc. Among them, a polymerization inhibitor, an antioxidant, etc. are preferably contained. The total mass of such additives is preferably from 0 to 10 parts by mass, more preferably from 0 to 5 parts by mass, based on the total mass (100 parts by mass) of the curable component I.

The chain transfer agent is a compound which receives radicals from a polymer grown by radical polymerization thereby to prevent elongation of the polymer. Therefore, by incorporating the chain transfer agent as an additive to the resin composition and adjusting the content of the chain transfer agent, it is possible to adjust the molecular weight of the curable components after curing.

The chain transfer agent may, for example, be a compound having a thiol group, such as n-octylmercaptan, n-dodecylmercaptan, 1,4-bis(3-mercaptobutylyloxy)butane or pentaerythritol tetrakis(3-mercaptobutylate).

The polymerization inhibitor is a compound which receives radicals from a polymer grown by radical polymerization thereby to terminate a reaction. By incorporating the polymerization inhibitor as an additive to the resin composition and adjusting its content to be lower than the polymerization initiator, it is possible to improve the stability of the resin composition and adjust the molecular weight after curing.

The polymerization inhibitor may, for example, be 2,5-di-tert-butylhydroquinone, mono-t-butylhydroquinone or p-t-butylcatechol.

When an antioxidant is incorporated as an additive for the resin composition, it is possible to increase the stability of the resin composition after curing. As a commercial antioxidant which can be added to the resin composition, Irganox 1010, Irganox 1035, Irganox 1076 or Irgastab PUR68 manufactured by BASF SE, or ADK STAB, PEP-8 or PEP-36/36A manufactured by ADEKA Corporation may, for example, be mentioned.

Figure 2:
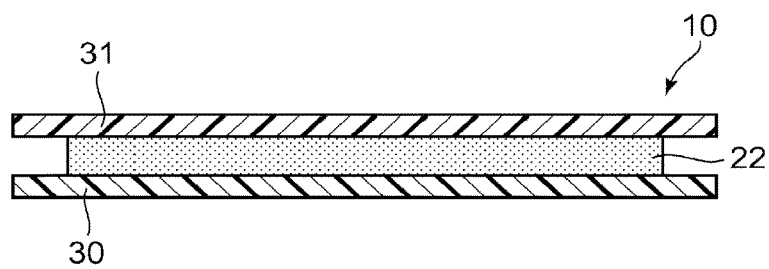
FIG. 2 is a cross-sectional view along I-I in FIG. 1 of the adhesive film of the present embodiment.

Now, one embodiment of the adhesive film of the present invention will be described with reference to the drawings. One embodiment of an adhesive film having a single layer of the adhesive layer I is shown in each of FIG. 1 and FIG. 2. FIG. 1 is a front view illustrating an embodiment of the adhesive film 10 having the adhesive layer 20 sandwiched by protective films 30 and 31, and FIG. 2 is a cross-sectional view along I-I in FIG. 1.

Figure 3:
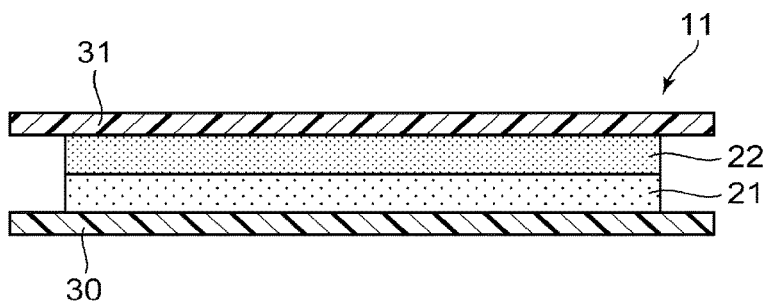
FIG. 3 is a cross-sectional view illustrating an adhesive film having two adhesive layers of the present embodiment.

The adhesive film of the present invention may be such that at least one adhesive layer is the adhesive layer I, and may have at least two adhesive layers. In the case of a structure having at least two adhesive layers, it is possible to obtain e.g. an adhesive film having different physical properties such as adhesion between a front layer and a back layer of the adhesive layer. FIG. 3 is a cross-sectional view illustrating an embodiment having two adhesive layers, and illustrating an embodiment of the adhesive film 11 having the adhesive layers 21 and 22 sandwiched by the protective films 30 and 31. In such a case, at least one of the adhesive layers 21 and 22 may be the adhesive layer I, and both of them are preferably the adhesive layer I.

In a case where the adhesive film has at least two adhesive layers, the entire thickness of the adhesive layer may freely be set depending on the application to bonding by using the adhesive film. For example, when a protective plate and a display panel of a display device are bonded using the adhesive film, the entire thickness of the adhesive layer is preferably from 0.15 to 2 mm, more preferably from 0.3 to 1.5 mm. When the entire thickness of the adhesive layer is at least 0.15 mm, in a case where a protective plate and a display panel of a display device are bonded, the adhesive layer can effectively absorb e.g. a shock by an external force from the protective plate side, whereby it is possible to protect the main body of the display device. Further, even if a foreign matter not exceeding the entire thickness of the adhesive layer is included between the protective plate and the display panel of the display device, the thickness of the adhesive layer is substantially unchanged, and influence over light transmitting performance is little. When the entire thickness of the adhesive layer is at most 2 mm, the protective plate can easily be bonded to the display panel of the display device via the adhesive layer, whereby it is possible to decrease the entire thickness of the display device.

(Protective Film)

The adhesive film of the present invention preferably has such an embodiment that the adhesive layer is in contact with a protective film or that the adhesive layer is sandwiched by protective films, whereby e.g. processing, transporting and storing of the adhesive layer will be easy.

The protective film preferably has a release agent on the surface to be in contact with the adhesive layer of a substrate. The release agent may, for example, be a silicone resin. The protective films to be in contact with the front layer and the back layer of a laminate of the adhesive layers may be the same or different. In order that a desirable surface layer side is peeled at the time of bonding the adhesive film, it is preferred to use different protective films so that there is a difference in the adhesion between the protective film and the adhesive layer.

As a method for making a difference in adhesion, a method of employing different thicknesses of the release layers for the protective films or a method of employing different release agents for the protective films, may be mentioned. Such a method may be freely designed depending on e.g. application of the adhesive film.

As the substrate for the protective film, a film of e.g. PET (polyethylene terephthalate), polyethylene, polypropylene or a fluororesin may be used.

The thickness of the substrate for the protective film differs depending upon a resin to be used, and it is preferably from 0.025 mm to 0.175 mm, more preferably from 0.038 mm to 0.125 mm when a PET film is used. When a polyethylene film or a polypropylene film is used, it is preferably from 0.04 mm to 0.2 mm, more preferably from 0.06 mm to 0.1 mm.

The protective film is preferably such that no gases (such as oxygen gas, nitrogen gas and water vapor) permeate from outside. The gas permeability of the protective film is preferably at most 100 cc/m²·day·atm. For example, it is possible to reduce permeation of gas by providing a barrier layer of a film of an inorganic compound such as alumina on the substrate.

<Process for Producing Adhesive Film>

The process for producing the adhesive film in the present embodiment may, for example, be a process for producing a single adhesive layer I by using one type of a resin composition or a process for producing at least two adhesive layers including at least one adhesive layer I by using at least two types of resin compositions.

The adhesive layer may, for example, be produced by coating the protective film with a resin composition, and irradiating it with light to cure the resin composition. As an example of production of the adhesive film, a method for producing an adhesive film 10 having one adhesive layer I by using a production apparatus 100 as shown in FIG. 4 will be described.

Figure 4:
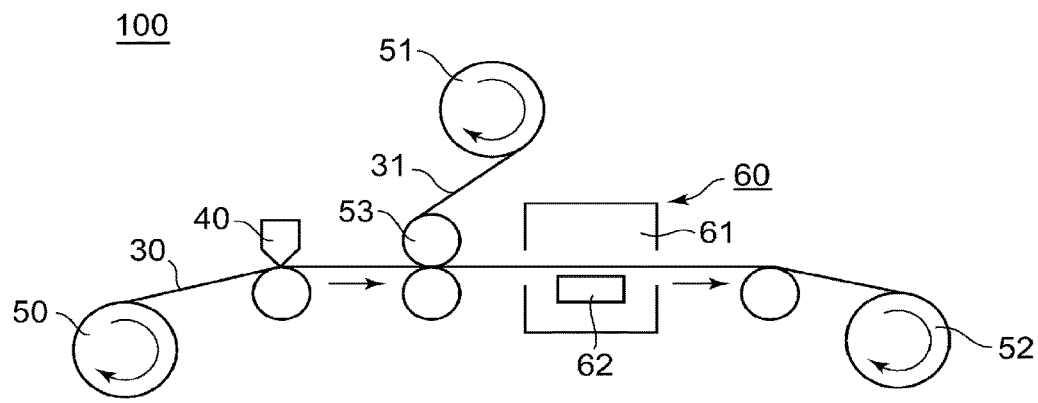
FIG. 4 is a view schematically illustrating a production apparatus for producing an adhesive film having one adhesive layer of the present embodiment.

As shown in FIG. 4, the production apparatus 100 comprises a first feed roll 50, a second feed roll 51, an application die 40, a bonding roll 53, a curing part 60 and a first wind-up roll 52.

A protective film 30 is sequentially fed from the feed roll 50, and the protective film 30 is continuously coated with a first resin composition by the application die 40. Further, a protective film 31 is sequentially fed from the feed roll 51, and the protective film 31 is bonded to the first resin composition by the bonding roll 53.

Then, the first resin composition is cured by irradiating it with light in the curing part 60 to form an adhesive layer (an adhesive layer corresponding to an adhesive layer 20 in FIG. 6), whereby a roll of the adhesive film 10 having the adhesive layer 20 sandwiched by the protective film 30 and the protective film 31 is produced.

The curing part 60 has a chamber 61 and a light source 62 placed in the chamber 61. The number of the light sources is one in the case shown in FIG. 4, but the number of the light source may be at least two. The light source 42 is a light source capable of applying ultraviolet rays, and at least one light source selected from the group consisting of a high pressure mercury lamp, a metal halide lamp and LED may, for example, be used. Further, the light source 62 may be positioned on the protective film 30 side or the side coated with the resin composition.

The interior atmosphere of the chamber 61 is not particularly limited. In a case where the interior of the chamber 61 is an inert gas atmosphere, at the time of irradiating the above-mentioned resin composition with ultraviolet rays (light irradiation) for a curing reaction, it is possible to prevent a side reaction by oxygen to deactivate radicals formed in the resin composition by irradiation with ultraviolet rays, such being preferred. The inert gas atmosphere is preferably such that the oxygen concentration would be at most 100 ppm, for example, by filling the interior of the chamber 41 with nitrogen.

Figure 5:
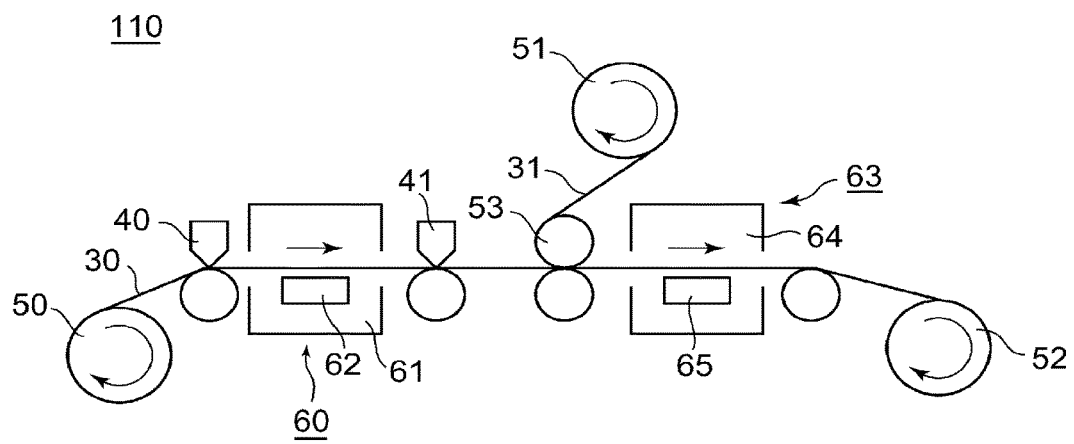
FIG. 5 is a view schematically illustrating a production apparatus for producing an adhesive film having two adhesive layers of the present embodiment.

As another example of production of the adhesive film, a process for producing an adhesive film 11 having two adhesive layers by using a production apparatus 110 as shown in FIG. 5, will be explained.

As shown in FIG. 5, the production apparatus 110 comprises the first feed roll 50, the second feed roll 51, the first application die 40, the first curing part 60, a second application die 41, a second curing part 63 and the first wind-up roll 52.

The protective film 30 is sequentially fed from the feed roll 50, and the protective film 30 is continuously coated with the first resin composition into a stripe shape by the first application die 40. Then, the first resin composition is cured by irradiating it with light in the first curing part 60 to form an adhesive layer (an adhesive layer corresponding to an adhesive layer 21 in FIG. 7).

Then, the adhesive layer 21 is continuously coated with the second resin composition into a stripe shape by the second application die 41. Further, the protective film 31 is sequentially fed from the feeding roll 51, and the protective film 31 is bonded to the second resin composition by the bonding roll 53.

Then, the second resin composition is cured by irradiating it with light in the second curing part 63 to form an adhesive layer (an adhesive layer corresponding to the adhesive layer 22 in FIG. 7), whereby a roll of the adhesive film 11 having a laminate (the adhesive layer 20) of the adhesive layer 21 and the adhesive layer 22 sandwiched by the protective film 30 and the protective film 31 is produced.

In the production apparatus 110, the first resin composition and the second resin composition to be used may be the same composition or different compositions. When the first and the second resin compositions are the same composition, it is possible to produce an adhesive film having a thick adhesive layer, and when the first and the second resin compositions to be used are different compositions, it is possible to produce an adhesive film having different physical properties between the front layer and the back layer.

Further, the application thicknesses of the resin compositions applied by the first application die and the second application die may be the same or different. Such an application thickness may be suitably adjusted depending upon the design of the adhesive film to be produced.

The atmosphere and the light irradiation conditions in each of the first curing part 60 and the second curing part 63 are the same as in the curing part of the production apparatus 100. The atmosphere and the light irradiation conditions in the first curing part 60 and the second curing part 63 may be the same or different. Further, the light sources 62 and 65 may be positioned on the protective film 30 side or the side coated with the resin composition.

As another example of production of the adhesive film, a process may be mentioned, wherein at least two adhesive films 10 produced by the production apparatus 100 as shown in FIG. 4 are prepared, protective films on one side of the respective adhesive films 10 are peeled, and the adhesive films 10 are laminated.

When the resin compositions of the adhesive layers in the adhesive films to be used have the same composition, the adhesive layer can be thick with the same physical properties, and when the resin compositions have a different composition, an adhesive film having different physical properties between the front layer and the back layer can be produced.

The adhesive film is used by cutting it into a desired size depending on the application. The adhesive film may be cut by a laser cutter or a rotary blade. In a case where the adhesive film is soft and has a shear modulus being smaller than 100 kPa, it is preferred to use a laser cutter with a view to preventing re-attachment after cutting.

<Adhesive Layer-Equipped Transparent Plate>

Figure 6:
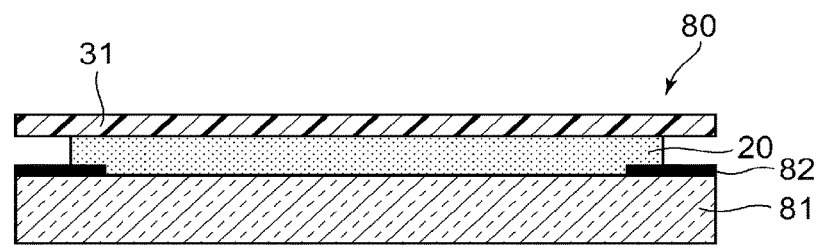
FIG. 6 is a cross-sectional view illustrating an adhesive layer-equipped transparent plate having one adhesive layer of the present embodiment.
Figure 7:
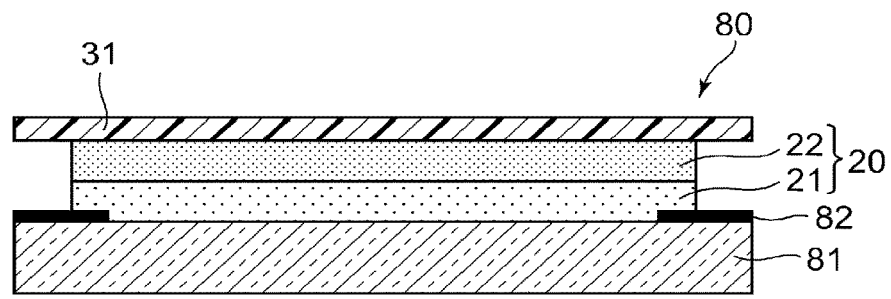
FIG. 7 is a cross-sectional view illustrating an adhesive layer-equipped transparent plate having two adhesive layers of the present embodiment.

As shown in FIG. 6 or FIG. 7, an adhesive layer-equipped transparent plate 80 of the present embodiment has at least one adhesive layer 20 on a transparent plate 81. FIG. 6 and FIG. 7 illustrate embodiments of an adhesive layer-equipped transparent plate using the transparent plate 81 as a protective plate for a display device as explained below, which comprises the transparent plate 81 having a light-shielding printed portion 82 at the peripheral portion and at least one adhesive layer 20 thereon, and the protective film 31 on the surface of the adhesive layer 20 opposite from the transparent plate 81.

The adhesive layer-equipped transparent plate of the present embodiment has at least one adhesive layer I. In a case where at least two adhesive layers are provided thereon, at least one layer should be the adhesive layer I, and it is preferred that all of them are the adhesive layer I. Further, the respective adhesive layers may be the same or different.

[Transparent Plate]

The transparent plate has transparency, and the plan view shape or the cross-sectional shape thereof is not limited. The plan view shape is designed depending on the application to be used, such as rectangular, or a linear or curve at the periphery. The cross-sectional shape may be a linear shape (that is a rectangular cross-sectional shape), a bent shape, or a combination of a linear shape and a bent shape having a linear shape at the center portion and a bent shape at the end portion.

The material for the transparent plate may be glass or a transparent resin. A glass material may, for example, be soda lime glass or aluminosilicate glass. As the glass, a high transparent glass or tempered glass may be used, and especially in a case where a thin transparent plate is used, chemically tempered glass is preferred. As a transparent resin material, a resin material having high transparency (such as an acrylic resin such as polycarbonate or polymethyl methacrylate) may be mentioned.

The thickness of the transparent plate is usually preferably from 0.5 to 25 mm in the case of a glass plate, and is preferably from 2 to 10 mm in the case of a transparent resin plate, from the viewpoint of transparency.

In order to improve the interfacial adhesive force with the adhesive layer, surface treatment may be applied to the transparent plate. The method for the surface treatment may, for example, be a method of treating the surface of the transparent plate with a silane coupling agent, or a method of forming a thin film of silicon oxide by oxidative flame by a flame burner.

[Protective Plate for Display Device]

The above transparent plate can be suitably used as a protective plate to be used for protecting a display panel of a display device. In a case where the transparent plate is used as a protective plate, the material for the protective plate is preferably a glass plate from the viewpoint of light resistance, low birefringence, high flatness, surface scratching resistance and high mechanical strength, as well as the transparency to emitted light or reflected light from the display panel.

In a case where the transparent plate is used as a protective plate, in order to increase the contrast of a display image, an anti-reflection layer may be provided on the opposite side of the protective plate from the surface on which the adhesive layer is formed. The anti-reflection layer may be provided by a method of directly forming an inorganic thin film having a low refractive index on the surface of the protective plate, or a method of bonding a transparent resin film provided with the anti-reflection layer to the protective plate.

The protective plate may be partly or entirely colored; part or whole of the surface of the protective plate may be made to be ground-glass to scatter light; or e.g. fine irregularities may be formed on part or whole of the surface of the protective plate to refract or reflect transmitted light. Or, a colored film, a light-scattering film, a light-refracting film, a light-reflecting film, etc. may be bonded to part or whole of the surface of the protective plate.

In a case where a transparent plate is used as a protective plate, in applications to e.g. TV receivers, PC displays, etc., the thickness is preferably from 0.5 mm to 6 mm with a view to weight reduction of the display device, and in applications to public displays to be installed outdoor, the thickness is preferably from 3 mm to 20 mm. In the case of using chemically tempered glass, the thickness of the protective plate is preferably from about 0.4 mm to 1.5 mm.

[Light-Shielding Printed Portion]

It is preferred that the protective plate is provided with a light shielding portion along the periphery of the protective plate (the transparent plate), that is the light-shielding printed portion 82 is provided along the periphery of the transparent plate 81, as shown in FIG. 6 and FIG. 7, so that the region other than the image display region of the display panel would be invisible from the protective plate side, whereby it is possible to shield e.g. wiring members connected to the display panel. The light-shielding portion is preferably formed on the surface where the adhesive layer is formed of the protective plate.

A method for forming the light-shielding portion may, for example, be a method of printing a ceramic coating material containing a black pigment or a method of bonding a transparent film preliminarily provided with a light-shielding portion.

<Method for Producing Adhesive Layer-Equipped Transparent Plate>

A method for producing the adhesive layer-equipped transparent plate of the present embodiment may, for example, be a method wherein an adhesive film is transferred onto a transparent plate or a method wherein a resin composition is directly applied on a transparent plate and cured to form an adhesive layer.

Regarding the method wherein an adhesive film is transferred onto a transparent plate, in a case where a plurality of adhesive layers are provided on the transparent plate, a method of cutting the adhesive film of the present embodiment into a desired size and then transferring at least one of them onto the transparent plate, or a method of preliminarily bonding the adhesive films of the present embodiment to each other and then cutting them into a desired shape and transferring them onto the transparent plate, may, for example, be mentioned.

As the method wherein a resin composition is directly applied on a transparent plate to form an adhesive layer, a die coating method or a method using a dispenser may, for example, be mentioned. After the resin composition is applied on the transparent plate, a protective film is bonded to the resin composition, and ultraviolet rays are applied thereto for curing, whereby an adhesive layer is formed. The method and conditions for applying ultraviolet rays are preferably the same as the ultraviolet ray irradiation in the process for producing the adhesive film of the present embodiment.

<Laminate>

The adhesive film of the present invention is suitably used for bonding plates to each other to produce a laminate. For example, the adhesive film is used for bonding a pair of glass plates to produce a laminated glass. Further, the adhesive film is used to bond a protective plate and a display panel to produce a display device.

Further, the adhesive layer-equipped transparent plate of the present invention may, for example, be bonded to a display panel to produce a display device.

Now, a display device will be explained as an example in which the adhesive film and the adhesive layer-equipped transparent plate are used.

Figure 8:
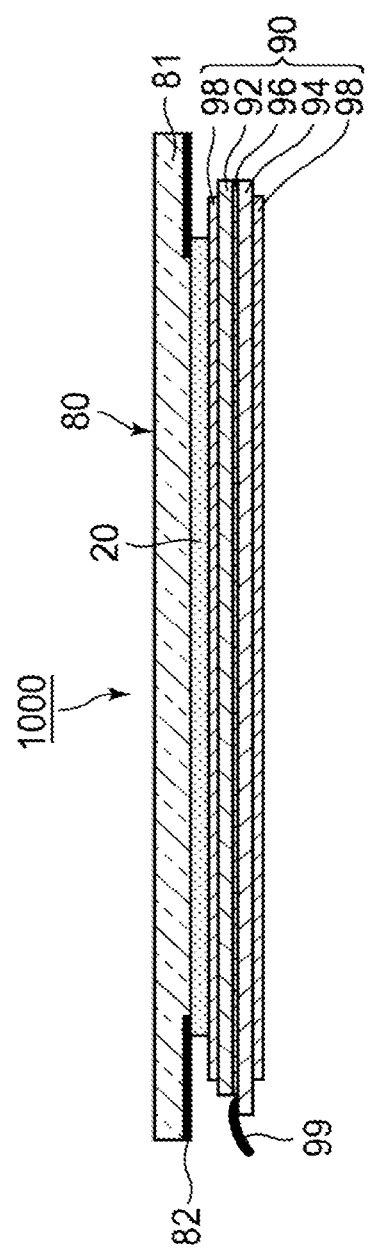
FIG. 8 is a cross-sectional view illustrating a display device having an adhesive layer of the present embodiment.

FIG. 8 is a cross-sectional view illustrating one example of the embodiment of a display device.

A display device 1000 of the present embodiment comprises a display panel 90 and the protective plate 81 (that is a transparent plate) bonded via the adhesive layer 20. As the adhesive layer 20 of the present embodiment, the adhesive layer I is used.

The display panel 90 is a liquid crystal panel having such a structure that a transparent substrate 92 having a color filter, and a transparent substrate 94 having TFT (thin film transistor) are bonded via a liquid crystal layer 96, and such an assembly is sandwiched by a pair of polarizing plates 98.

A method for producing the display device 1000 may, for example, be a method of preparing an adhesive film of the present embodiment having protective films on both sides, peeling one protective film and bonding the adhesive film to a transparent plate as the protective plate 81, and peeling the other protective film and bonding the adhesive film to the display surface of the display panel, or a method of preparing an adhesive layer-equipped transparent plate of the present embodiment, peeling a protective film and bonding the plate to the display surface of the display panel.

EXAMPLES

Now, the embodiment of the present invention will be described with reference to Examples and Comparative Examples. Ex. 1 to 5 are Examples of the present invention, and Ex. 6 and 7 are Comparative Examples.

Ex. 1

A resin composition to form an adhesive layer was produced as follows.

Bifunctional polypropylene glycol having molecular terminals modified with ethylene oxide (number average molecular weight calculated by hydroxy value: 4,000) and isophorone diisocyanate were mixed in a molar ratio of 4:5 and reacted at 70° C. in the presence of a tin catalyst to obtain a prepolymer. This prepolymer and 2-hydroxyethyl acrylate were mixed in a molar ratio of approximately 1:2 and reacted at 70° C. to obtain an urethane acrylate polymer (hereinafter abbreviated as UA). UA had two curable groups, a number average molecular weight of about 24,000 and a viscosity of about 830 Pa·s at 25° C.

The above UA as the polymer A1, 4-hydroxybutyl acrylate (product name: 4HBA, manufactured by Osaka Organic Chemical Industry Ltd.) as the monomer A2' and n-dodecyl acrylate (product name: light acrylate L-A LA, manufactured by Kyoeisha Chemical Co., Ltd.) as the monomer A2" were prepared. These components were mixed in a proportion by parts by mass as shown in Table 1 to obtain a curable component I.

Then, bis(2,4,6)-trimethylbenzoyl)-phenylphosphine oxide (product name: IRGACURE 819, manufactured by BASF) as the photopolymerization initiator III (represented as polymerization initiator III in Table 1), n-dodecylmercaptan (product name: THIOKALCOL 20, manufactured by Kao Corporation) as a chain transfer agent, pentaerythritol tetrakis[3-(3,5-di-tert-butyl-4-hydroxyphenyl)propionate] (product name: IRGANOX 1010 manufactured by BASF) as an antioxidant, 2,5-di-tert-butylhydroquinone (DTBHQ manufactured by Tokyo Chemical Industry Co., Ltd.) as a polymerization inhibitor and an ultraviolet absorber (Tinuvin 383-2 manufactured by BASF) were prepared. These components were mixed with the curable component I in a proportion by parts by mass as shown in Table 1, based on 100 parts by mass of the curable component I.

Then, as the non-curable component II, bifunctional polypropylene glycol having molecular terminals modified with ethylene oxide (number average molecular weight: 4,000) and bifunctional polypropylene glycol having molecular terminals modified with ethylene oxide (number average molecular weight: 7,000) were prepared. They were added to the above mixture in a proportion by parts by mass as shown in Table 1, based on 100 parts by mass of the curable component I, followed by mixing to obtain a resin composition 1.

A silicone sheet (thickness: 0.5 mm) having its center portion hollowed out, was placed on a mold release PET film (150 mm×150 mm, thickness: 125 μm) as a protective film, and the resin composition 1 was applied on its center portion by means of bar coating. A mold release PET film (150 mm×150 mm, thickness: 75 μm) was laminated on the resin composition 1. The laminate was irradiated with ultraviolet rays with a mercury lamp (cumulative radiation: 1,500 mJ/cm$^2$) to cure the resin composition 1 to obtain an adhesive film 1 having one adhesive layer.

The thickness of the adhesive layer was 0.5 mm.

Ex. 2

A resin composition 2 was obtained in the same manner as in Ex. 1 except that the proportion by parts by mass of each component in the resin composition was changed as shown in Table 1. Using the resin composition 2, an adhesive film 2 having one adhesive layer was obtained in the same manner as in Ex. 1.

Ex. 3

A resin composition 3 was obtained in the same manner as in Ex. 1 except that the polymerization initiator III was changed to 1-hydroxycyclohexyl phenyl ketone (product name: IRGACURE 184, manufactured by BASF), the antioxidant was changed to IRGASTAB PUR68 (product name) manufactured by BASF, no ultraviolet absorber and no non-curable component II were used, and the proportion by parts by mass of each component was changed as shown in Table 1. Using the resin composition 3, an adhesive film 3 having one adhesive layer was obtained in the same manner as in Ex. 1.

Ex. 4

A resin composition 4 was obtained in the same manner as in Ex. 3 except that the non-curable component II was used and the proportion by parts by mass was changed as shown in Table 1. Using the resin composition 4, an adhesive film 4 having one adhesive layer was obtained in the same manner as in Ex. 1.

Ex. 5

A resin composition 5 was obtained in the same manner as in Ex. 3 except that the proportion by parts by mass was changed as shown in Table 1. Using the resin composition 5, an adhesive film 5 having one adhesive layer was obtained in the same manner as in Ex. 1.

Ex. 6

Three sheets of commercially available high transparency adhesive films (product name: CEF03A07, manufactured by 3M) each having a thickness of 0.175 mm, were laminated to obtain an adhesive film 6 having three adhesive layers.

Ex. 7

Three sheets of commercially available high transparency adhesive films (product name: CEF0507, manufactured by 3M) each having a thickness of 0.175 mm were laminated to obtain an adhesive film 7 having three adhesive layers.

The adhesive films 1 to 7 obtained in Ex. 1 to 7 were used to carry out the following evaluation. The results are shown in Table 2.

(Gas Diffusion Coefficient Measurement)

Permeability coefficient measurements of nitrogen gas, oxygen gas and air were carried out by using a high temperature and high pressure gas permeability measurement apparatus (product name: K-315-H, manufactured by Tsukuba Rika Seiki K.K.) by the following method.

A measurement sample was prepared in such a manner that one mold release PET of the adhesive film was peeled, the adhesive film was bonded to an oriented polypropylene (OPP) substrate having a thickness of 30 μm, then the other mold release PET was peeled, and the adhesive film was sandwiched by a cell having a diameter of 50 mm.

In the measurement, high purity nitrogen gas and oxygen gas, and air were respectively used.

Nitrogen gas, oxygen gas or air was introduced from the OPP substrate side at 25° C. and 100 kPa, and changes with time of pressure of nitrogen gas, oxygen gas and air permeated through the sample sandwiched by the cell were measured by a mass spectrometer to obtain permeability curves.

The diffusion coefficient D of each of nitrogen, oxygen and air was calculated by the formula 2 from the delay time $t_0$ in a non-steady state in the permeability curve obtained. Further, the value ($t_0=t_1-t_2$) obtained by subtracting a delay time $t_2$ in a non-steady state in a permeability curve of a sample which is only the OPP substrate, from a delay time $t_1$ in a non-steady state in a permeability curve of a sample which is an adhesive layer provided with a substrate, was regarded as the delay time $t_0$.

$$D=L^2/(6 \times t_0) \qquad \text{Formula 2}$$

wherein L is a film thickness (unit: cm) of the adhesive layer.

Further, in Table 2, each diffusion coefficient (cm$^2$/sec.) was represented by a unit of "cm$^2$/sec".

(Shear Modulus Measurement and Loss Tangent Measurement)

Using ARES-G2 rheometer (product name) manufactured by TA Instruments, a shear modulus and loss tangent (tan δ) of the adhesive layer were measured as follows. At 25° C., frequency of 0.01 to 100 Hz and distortion of 3%, a parallel plate of 25 mm was used. The shear modulus and loss tangent (tan δ) at a frequency of 1 Hz were regarded as a shear modulus and loss tangent (tan δ) at 25° C. The values of the shear modulus and loss tangent (tan δ) were not influenced by the thickness of the adhesive film and therefore one sheet (thickness: 0.175 μm) of a commercially available high transparency adhesive film was used without lamination, in Ex. 6 and Ex. 7.

(Glass Transition Temperature Measurement)

A glass transition temperature of the adhesive layer of each of the adhesive films 1 to 7 was measured by means of DVA-200 (product name) manufactured by ITK Co., Ltd. The measurement was carried out at a measurement temperature of from −120 to 180° C., a temperature-raising rate of 3° C./min. and a frequency of 1 Hz, and in the chart of a temperature change of a tensile dynamic modulus E', the intersecting point at which a low-temperature side tangent line of the tensile dynamic modulus E' intersects with a tangent line of a region where the tensile dynamic modulus E' rapidly decreases, was regarded as the glass transition temperature of the adhesive layer.

(Bubble Disappearance Evaluation)

A glass plate (dimension: 55 mm×120 mm×0.7 mm, opening portion: 49 mm×90 mm) having a light-shielding printed portion with a height of 80 μm at a peripheral portion was prepared. One mold release PET in each of the adhesive films 1 to 7 was peeled and the adhesive film was bonded to the glass plate, to obtain adhesive layer equipped glass plates 1 to 7. From each of the adhesive layer equipped glass plates 1 to 7, the other mold release PET was peeled and the glass plate was bonded to the surface of a polarizing plate of a 0.2 mm-thickness polarizing plate-equipped glass (53 mm×96 mm, thickness: 0.7 mm) via the adhesive layer at a torque of 0.4 N·m thereby to obtain an evaluation sample. A time until bubbles formed on the interface between the adhesive layer and the polarizing plate disappeared was measured, and the time was represented as the bubble disappearance property. The time until the bubbles disappeared was 168 hours at a maximum.

TABLE 1

| | | Ex. 1 | Ex. 2 | Ex. 3 | Ex. 4 | Ex. 5 |
|---|---|---|---|---|---|---|
| Curable component I | Polymer A1 | 50 | 50 | 50 | 50 | 50 |
| | Monomer A2' | 20 | 10 | 20 | 20 | 20 |
| | Monomer A2" | 30 | 40 | 30 | 30 | 30 |
| Non-curable component II | Polypropylene glycol (number average molecular weight: 4,000) | 20 | 20 | 0 | 20 | 0 |
| | Polypropylene glycol (number average molecular weight: 7,000) | 20 | 20 | 0 | 20 | 0 |
| Polymerization initiator III | Bis(2,4,6)-trimethylbenzoyl-phenylphosphine oxide | 0.5 | 0.5 | | | |
| | 1-hydroxycyclohexyl phenyl ketone | | | 3 | 3 | 3 |
| Chain transfer agent | THIOKALCOL 20 | 0.5 | 0.2 | 1 | 0.5 | 0.5 |
| Polymerization inhibitor | DtBHQ | 0.08 | 0.08 | 0.08 | 0.08 | 0.08 |
| Antioxidant | Pentaerythritol tetrakis[3-(3,5-di-tert-butyl-4-hydroxyphenyl)propionate] | 0.5 | 0.5 | | | |
| | IRGASTAB PUR68 (product name) | | | 1 | 1 | 1 |
| Ultraviolet absorber | TINUVIN 383-2 (product name) | 0.3 | 0.1 | 0 | 0 | 0 |

TABLE 2

| | Ex. 1 | Ex. 2 | Ex. 3 | Ex. 4 | Ex. 5 | Ex. 6 | Ex. 7 |
|---|---|---|---|---|---|---|---|
| Nitrogen diffusion coefficient (cm²/sec.) | $2.1 \times 10^{-6}$ | $1.9 \times 10^{-6}$ | $1.6 \times 10^{-6}$ | $1.7 \times 10^{6}$ | $2.0 \times 10^{-6}$ | $1.1 \times 10^{-6}$ | $0.4 \times 10^{-6}$ |
| Oxygen diffusion coefficient (cm²/sec.) | $2.6 \times 10^{-6}$ | $2.6 \times 10^{-6}$ | $2.1 \times 10^{-6}$ | $2.3 \times 10^{-6}$ | $2.3 \times 10^{-6}$ | $1.9 \times 10^{-6}$ | $0.7 \times 10^{-6}$ |
| Air diffusion coefficient (cm²/sec.) | $2.0 \times 10^{-6}$ | $2.1 \times 10^{-6}$ | $1.9 \times 10^{-6}$ | $1.8 \times 10^{-6}$ | $2.0 \times 10^{-6}$ | $1.6 \times 10^{-6}$ | $0.8 \times 10^{-6}$ |
| Shear modulus (Pa) | $9.6 \times 10^{3}$ | $14 \times 10^{3}$ | $40 \times 10^{3}$ | $11 \times 10^{3}$ | $38 \times 10^{3}$ | $30 \times 10^{3}$ | $86 \times 10^{3}$ |
| Loss tangent | 0.53 | 0.36 | 0.46 | 0.49 | 0.44 | — | — |
| Glass transition temperature (° C.) | −72 | −72 | −68 | −73 | −70 | −60 | −31 |
| Bubble disappearance time (hour) | 15 | 97 | 168 | 6 | 43 | Not disappeared | Not disappeared |

The adhesive layer of the adhesive film in Ex. 1 to 7, had an absorption peak at from 800 to 820 cm$^{-1}$ and no absorption peak at from 1,000 to 1,020 cm$^{-1}$, in an infrared absorption spectrum, which is not shown in Tables.

In the adhesive films in Ex. 1 to 5, the diffusion coefficient of nitrogen gas and the shear modulus G' (1 Hz) of the adhesive layer were within prescribed ranges, the diffusion coefficient of the nitrogen gas was thus high, and therefore bubbles formed at the interface between the adhesive layer and the polarizing plate disappeared in a short period of time. On the other hand, in Ex. 6 where a conventional adhesive film was used, the shear modulus G' (1 Hz) of the adhesive layer was within a prescribed range, but the diffusion coefficient of nitrogen gas of the adhesive layer was low, and therefore bubbles formed at the interface between the adhesive layer and the polarizing plate did not disappear at the expiration of 168 hours. Further, in Ex. 7, the diffusion coefficient of nitrogen gas of the adhesive layer was low, further the shear modulus G' (1 Hz) of the adhesive layer was also high, and therefore bubbles formed at the interface between the adhesive layer and the polarizing plate did not disappear at the expiration of 168 hours.

INDUSTRIAL APPLICABILITY

According to the present invention, it is possible to provide an adhesive film by which, even if air bubbles are formed at the bonding interface when the adhesive film is used for bonding plates, the air bubbles disappear under normal pressure, and to provide an adhesive layer-equipped transparent plate. Further, it is possible to provide a display device in which formation of air bubbles is suppressed.

REFERENCE SYMBOLS 10, 11: Adhesive film, 20, 21, 22: Adhesive layer, 30, 31, 32, 33: Protective film, 40, 41: Application die, 50, 51: Feed roll, 52: Wind-up roll, 53: Bonding roll, 60, 63: Application portion, 61, 64: Chamber, 62, 65: Light source, 80: Adhesive layer-equipped transparent plate, 81: Transparent plate, 82: Light-shielding portion.

What is claimed is:

1. An adhesive film comprising at least one adhesive layer, wherein the adhesive layer satisfies the following requirements (a) to (c):
   (a) a diffusion coefficient of nitrogen gas is at least $1.5 \times 10^{-6}$ cm²/sec,
   (b) a shear modulus G' (1 Hz) is from $5 \times 10^{2}$ to $1.0 \times 10^{5}$ Pa, at a measurement temperature of 25° C. and a frequency of 1 Hz, and
   (c) the adhesive layer has an absorption peak at from 800 to 820 cm$^{-1}$ and no absorption peak at from 1,000 to 1,020 cm$^{-1}$, in an infrared absorption spectrum,
   wherein the adhesive layer has a glass transition temperature of at most −65° C. and
   wherein the adhesive layer is formed by curing a resin composition comprising:
      a curable component comprising at least one polymer (A1) having a curable group and a number average molecular weight of from 1,000 to 100,000, and at least one monomer (A2) having a curable group and a molecular weight of from 125 to 600;
      a non-curable component comprising a polymer (B) comprising a hydroxy group; and
      a photopolymerization initiator.

2. The adhesive film according to claim 1, wherein the adhesive layer has a tan δ of from 0.01 to 1.4 at a measurement temperature of 25° C. and a frequency of 1 Hz.

3. A display device having a transparent plate and a display panel laminated via the adhesive film according to claim 1.

4. An adhesive layer-equipped transparent plate comprising a transparent plate and at least one adhesive layer, wherein the adhesive layer satisfies the following requirements (a) to (c):
   (a) a diffusion coefficient of nitrogen gas is at least $1.5 \times 10^{-6}$ cm²/sec,
   (b) a shear modulus G' (1 Hz) is from $5 \times 10^{2}$ to $1.0 \times 10^{5}$ Pa, at a measurement temperature of 25° C. and a frequency of 1 Hz, and
   (c) the adhesive layer has an absorption peak at from 800 to 820 cm$^{-1}$ and no absorption peak at from 1,000 to 1,020 cm$^{-1}$, in an infrared absorption spectrum,
   wherein the adhesive layer has a glass transition temperature of at most −65° C. and
   wherein the adhesive layer is formed by curing a resin composition comprising:
      a curable component comprising at least one polymer (A1) having a curable group and a number average molecular weight of from 1,000 to 100,000, and at least one monomer (A2) having a curable group and a molecular weight of from 125 to 600;
      a non-curable component comprising a polymer (B) comprising a hydroxy group; and
      a photopolymerization initiator.

5. The adhesive layer-equipped transparent plate according to claim 4, wherein the adhesive layer has a tan δ of from 0.1 to 1.4, at a measurement temperature of 25° C. and a frequency of 1 Hz.

6. The adhesive layer-equipped transparent plate according to claim 4, wherein the transparent plate is a protective plate configured for a display device.

7. A method for producing an adhesive film, comprising:
   forming at least one adhesive layer on a protective film under normal pressure,
   wherein the at least one adhesive layer satisfies the following requirements (a) to (c):
   (a) a diffusion coefficient of nitrogen gas is at least $1.5 \times 10^{-6}$ cm²/sec, (b) a shear modulus G' (1 Hz) is from $5\times10^2$ to $1.0\times10^5$ Pa, at a measurement temperature of 25° C. and a frequency of 1 Hz, and (c) the adhesive layer has an absorption peak at from 800 to 820 $cm^{-1}$ and no absorption peak at from 1,000 to 1,020 $cm^{-1}$, in an infrared absorption spectrum, wherein the adhesive layer is formed by curing a resin composition comprising:

a curable component comprising at least one polymer (A1) having a curable group and a number average molecular weight of from 1,000 to 100,000, and at least one monomer (A2) having a curable group and a molecular weight of from 125 to 600;

a non-curable component comprising a polymer (B) comprising a hydroxy group; and a photopolymerization initiator.

8. The method according to claim 7, wherein the adhesive layer has a glass transition temperature of at most −65° C.

9. The method according to claim 7, wherein the adhesive layer has a tan δ of from 0.01 to 1.4 at a measurement temperature of 25° C. and a frequency of 1 Hz.

\* \* \* \* \*